(12) United States Patent
Miller et al.

(10) Patent No.: US 12,370,920 B1
(45) Date of Patent: Jul. 29, 2025

(54) ON-BOARD VEHICLE INVERTER WITH SELECTABLE NEUTRAL BONDING

(71) Applicant: GM GLOBAL TECHNOLOGY OPERATIONS LLC, Detroit, MI (US)

(72) Inventors: Samantha Gunter Miller, Berkley, MI (US); Douglas S. Cesiel, Farmington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/617,901

(22) Filed: Mar. 27, 2024

(51) Int. Cl.
*B60L 55/00* (2019.01)
*H02J 3/32* (2006.01)

(52) U.S. Cl.
CPC .............. *B60L 55/00* (2019.02); *H02J 3/322* (2020.01)

(58) Field of Classification Search
CPC .................. B60L 55/00; H02J 3/322
See application file for complete search history.

(56) References Cited

U.S. PATENT DOCUMENTS

2020/0321797 A1* 10/2020 Gerrits ................ B60L 53/52
2023/0182614 A1*  6/2023 Mo ..................... H02J 7/0068
                                                    320/137

* cited by examiner

*Primary Examiner* — Daniel Cavallari (57) ABSTRACT

A vehicle system includes a power inverter coupled to an AC bus having a neutral conductor, a switching device coupled between the neutral conductor and a ground conductor, a sensor configured to measure an impedance between the neutral and ground conductors, and a control module. The power inverter is configured to provide AC power to an output via the AC bus. The control module is configured to transmit a signal to open the switching device to create a floating neutral configuration between the power inverter and the output, receive a signal from the sensor indicative of the impedance, and in response to the impedance between the neutral conductor and the ground conductor being less than or equal to a threshold, transmit a signal to the power inverter to provide AC power to the output. Other example vehicle systems and control methods are also disclosed.

20 Claims, 4 Drawing Sheets

ON-BOARD VEHICLE INVERTER WITH SELECTABLE NEUTRAL BONDING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an on-board vehicle inverter with a selectable neutral bonding.

Vehicles sometimes include a power supply system having one or more on-board power converters, such as an inverter for converting DC power into AC power. An on-board vehicle inverter is often used to power an AC outlet in the vehicle and cord-connected loads in a remote or mobile location. If a vehicle inverter is present, a neutral conductor on the output side of the inverter is electrically connected (e.g., bonded) to ground in the vehicle (e.g., a vehicle chassis) to ensure electrical safety.

SUMMARY

A vehicle system in a vehicle for providing AC power to an output external to the vehicle. The vehicle system includes a power inverter coupled to an AC bus having a neutral conductor, a switching device coupled between the neutral conductor of the AC bus and a ground conductor in the vehicle, a sensor configured to measure an impedance between the neutral conductor and the ground conductor, and a control module in communication with the sensor and the switching device. The power inverter is configured to provide AC power to the output external to the vehicle via the AC bus. The control module is configured to transmit a control signal to open the switching device to create a floating neutral configuration between the power inverter and the output external to the vehicle, receive a signal from the sensor indicative of the impedance between the neutral conductor and the ground conductor, and in response to the impedance between the neutral conductor and the ground conductor being less than or equal to a defined threshold, transmit a control signal to the power inverter to provide AC power to the output external to the vehicle.

In other features, the vehicle system further includes a power interrupting device coupled to an output of the power inverter.

In other features, the power interrupting device includes a ground fault circuit interrupter (GFCI).

In other features, the switching device is coupled between the power inverter and the power interrupting device.

In other features, the switching device is a normally closed switching device.

In other features, the power inverter is a unidirectional power inverter or a bidirectional converter.

In other features, the sensor is a first sensor, and the vehicle system further includes a receptacle configured to receive a power cable for coupling the AC bus to the output external to the vehicle, and a second sensor configured to detect a presence of the power cable.

In other features, the control module is configured to receive a signal from the second sensor indicating the power cable is present, and transmit the control signal to open the switching device in response to receiving the signal from the second sensor.

In other features, the vehicle system further includes a user input device in communication with the control module.

In other features, the control module is configured to receive a signal from the user input device requesting AC power be provided to the output external to the vehicle and transmit the control signal to open the switching device in response to receiving the signal from the user input device.

In other features, the sensor is a first sensor, and the vehicle system further includes at least one secondary receptacle in the vehicle and coupled to the power inverter, and a second sensor configured to detect a presence of a device being plugged into the at least one secondary receptacle.

In other features, the control module is configured to receive a signal from the second sensor indicating no device is present and transmit the control signal to open the switching device in response to receiving the signal from the second sensor.

In other features, the defined threshold is substantially zero.

In other features, the control module is configured to transmit a control signal to close the switching device in response to the impedance between the neutral conductor and the ground conductor being greater than the defined threshold.

In other features, a vehicle includes the vehicle system configured to provide AC power to an output external to the vehicle.

A control method for providing AC power in a vehicle to an output external to the vehicle is disclosed. The vehicle includes a power inverter coupled to an AC bus having a neutral conductor and a switching device coupled between the neutral conductor of the AC bus and a ground conductor in the vehicle. The control method includes transmitting a control signal to open the switching device to create a floating neutral configuration between the power inverter and the output external to the vehicle, determining an impedance between the neutral conductor of the AC bus and the ground conductor in the vehicle, and in response to the impedance between the neutral conductor and the ground conductor being less than or equal to a defined threshold, transmitting a control signal to the power inverter to provide AC power to the output external to the vehicle.

In other features, the switching device is a normally closed switching device.

In other features, the power inverter is a unidirectional power inverter or a bidirectional converter.

In other features, the control method further includes sensing a presence of a power cable configured to couple the AC bus to the output external to the vehicle, and transmitting the control signal to open the switching device includes transmitting the control signal to open the switching device in response to sensing the presence of the power cable.

In other features, the control method further includes receiving a signal from a user input device requesting AC power be provided to the output external to the vehicle, and transmitting the control signal to open the switching device includes transmitting the control signal to open the switching device in response to receiving the signal from the user input device.

In other features, the vehicle includes at least one secondary receptacle coupled to the power inverter and a sensor configured to detect a presence of a device being plugged into the at least one secondary receptacle.

In other features, the control method further includes receiving a signal indicating no device is plugged into the at least one secondary receptacle in the vehicle, and transmitting the control signal to open the switching device includes transmitting the control signal to open the switching device in response to receiving the signal.

In other features, the defined threshold is substantially zero.

In other features, the control method further includes transmitting a control signal to close the switching device in response to the impedance between the neutral conductor and the ground conductor being greater than the defined threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An on-board vehicle inverter is often used to power cord-connected loads in a remote or mobile location. In such examples, a neutral conductor on the output side of the inverter is electrically connected to ground in the vehicle. In some scenarios, it may be desirable to electrically connect the on-board vehicle inverter to a building, such as a house, to supply power to the building during, for example, a utility power outage. However, like the vehicle, a neutral conductor in the building is electrically connected to ground (e.g., earth ground). As such, if the on-board vehicle inverter and the building are electrically connected, a parallel path exists with respect to the neutral and ground conductors between the vehicle and the building, thereby allowing load current (e.g., return current to the building) to flow on the ground conductor between the vehicle and the building. This creates unsafe conditions. As such, if the current flowing on the ground conductor exceeds a minimal threshold (e.g., 5 mA), a power interrupting device in the vehicle trips to disconnect the inverter and the building, thereby preventing the vehicle from supplying power to the building.

The vehicle systems and methods according to the present disclosure enable the selection of electrically connecting or disconnecting a neutral conductor on an output side of an on-board vehicle inverter to ground in the vehicle to create a bonded neutral or a floating neutral. As a result, when desired, the neutral conductor can be selectively disconnected from ground in the vehicle, thereby removing a current path on a ground conductor when the on-board vehicle is electrically connected to a building electrical power system (EPS). With this configuration, the on-board inverter can provide power in a safe manner to the building EPS without tripping a power interrupting device in the vehicle due to a bonded neutral connection. As such, this provides the ability to supply backup power from the vehicle inverter to the building in the event of a power outage. In doing so, the vehicle systems and methods herein provide a cost-effective and affordable solution for providing backup power to the building, particularly when the building includes existing backup power hardware (e.g., a transfer switch, an interlock switch, etc.).

Figure 1:
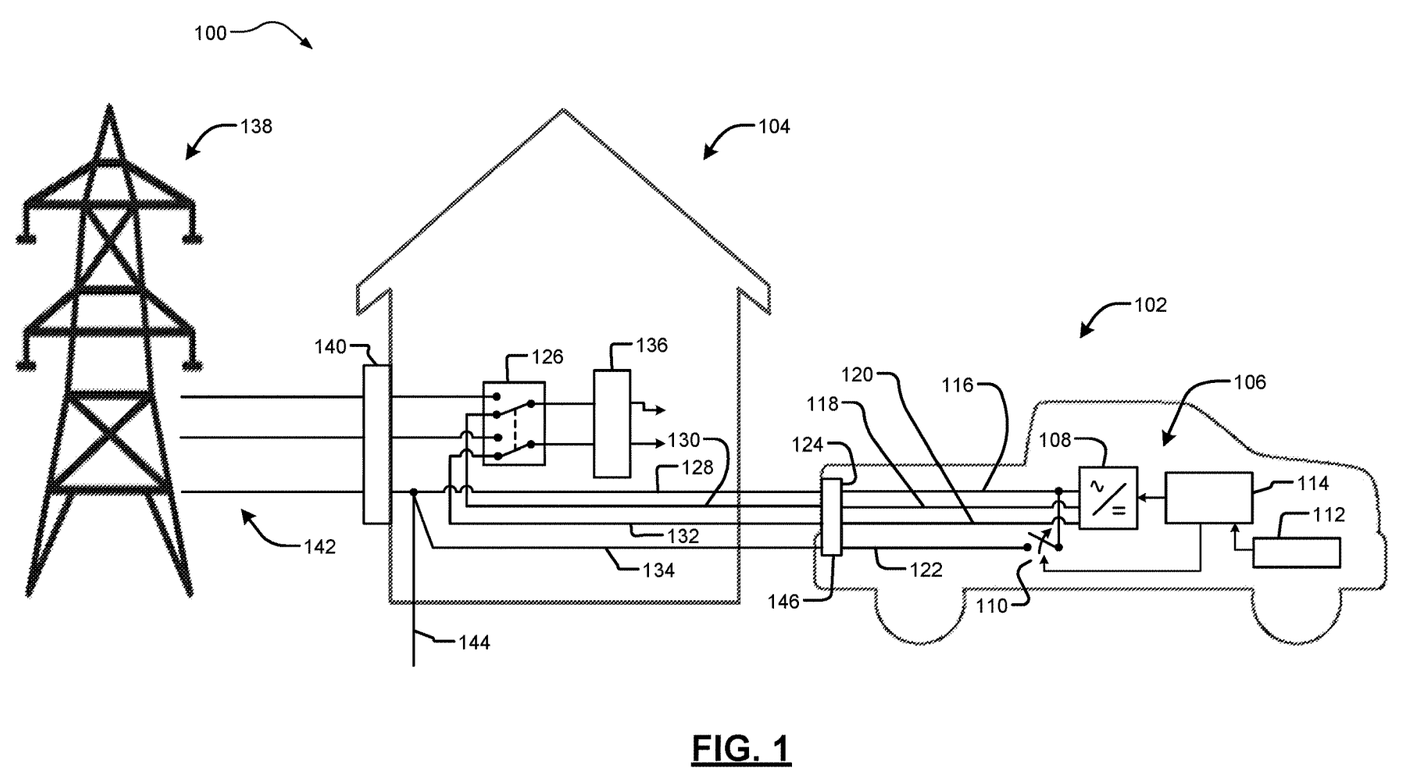
FIGS. 1-2 are block diagrams of example systems for providing AC power from a vehicle to a house, according to the present disclosure.

Referring now to FIG. 1, an example system 100 is presented for providing AC power from a vehicle 102 to an output external to the vehicle 102. In such examples, the vehicle 102 may be any suitable type of vehicle having an on-board power inverter, including an electric vehicle (EV) and a vehicle with an internal combustion engine (ICE). In various embodiments, the EV may include a pure EV, a hybrid vehicle, a fuel cell vehicle, or any other suitable type of EV having one or more electric machines that operate as a motor to propel the vehicle and as a generator during regeneration.

As shown in FIG. 1, the system 100 generally includes the vehicle 102 and a house 104. In this example, the vehicle 102 includes a vehicle system 106 for providing AC power to the house 104, as further explained herein. In FIG. 1, the vehicle system 106 generally includes a power inverter 108, a switching device 110, a sensor 112, and a control module 114. While the system 100 is shown and described as including the house 104, it should be appreciated that the system 100 may include another suitable power receiving output external to the vehicle 102, such as a building (e.g., an office building, an apartment building, etc.), another vehicle, etc.

In the example of FIG. 1, the power inverter 108 is an on-board power inverter coupled between a DC bus and an AC bus. In such examples, the AC bus includes a neutral conductor 116, line conductors 118, 120, and a ground conductor 122, and the DC bus includes a positive conductor and a negative conductor coupled to one or more battery modules in the vehicle 102. In various embodiments, the ground conductor 122 is connected to a chassis (e.g., metal frame) of the vehicle 102.

The power inverter 108 may be any suitable type of inverter. For example, the power inverter 108 may be a unidirectional DC-AC power inverter in which a DC input is converted into an AC output. In various embodiments, the power inverter 108 may be a dedicated inverter module providing 120 VAC and/or 240 VAC (e.g., split phase) from a DC input (e.g., a 400 VDC or 800 VDC input). In other examples, the power inverter 108 may be part of a bidirectional converter in which DC power may be converted into AC power (e.g., for the house 104) or AC power (e.g., from the house 104) may be converted into DC power (e.g., for charging the battery modules in the vehicle). In such embodiments, the power inverter 108 may provide power (e.g., 12 VDC, 120 VAC, etc.) to one or more outlets or receptacles in or the vehicle 102 and/or the house 104.

The power inverter 108 supplies AC power to the house 104 via a receptacle 124 located on or in the vehicle 102. For example, the house 104 may receive AC power from the vehicle 102 via a generator or power cable extending from the receptacle 124. For instance, the generator or power cable may plug into the receptacle 124 located on or in the vehicle 102. In such examples, the generator or power cable may be like an extension cord and include a neutral conductor 128, line conductors 130, 132, and a ground conductor 134. Then, in some examples, the generator or power cable may connect to a type of Romex wiring or similar inside the walls of the house 104, which is then connected a main disconnect switch 126 in the house 104. In this example, the ground conductor 134 is electrically connected to a ground rod 144 (e.g., earth ground) and the neutral conductor 128, thereby creating a bonded neutral configuration on the house side.

The main disconnect switch 126 of FIG. 1 may connect/disconnect a breaker panel 136 between a utility power grid 138 and the power inverter 108 in the vehicle 102. For example, under normal operating conditions, the main disconnect switch 126 receives AC power from the utility power grid 138 via a meter 140 and conductors 142. That AC power is then passed to the breaker panel 136 for powering loads in the house 104. If, however, a power outage occurs with respect to the utility power grid 138 and/or otherwise desired, the main disconnect switch 126 may receive AC power from the power inverter 108 which is then fed to the breaker panel 136. In such examples, a relay and/or another suitable switching device in the main disconnect switch 126 may be manipulated to connect/disconnect the breaker panel 136 between the utility power grid 138 and the power inverter 108.

In the example of FIG. 1, the main disconnect switch 126 is a transfer switch. However, it should be appreciated that in other embodiments, other suitable disconnect switches may be employed if desired. For example, the main disconnect switch 126 may be an interlock switch or another similar device to connect/disconnect the breaker panel 136 between the utility power grid 138 and the power inverter 108 in the vehicle 102.

In various embodiments, the vehicle system 106 includes one or more sensors. For example, the vehicle system 106 may include the sensor 112 as shown in FIG. 1 as well as other various sensors, such as sensors for detecting or otherwise sensing a presence of a device being plugged into an outlet/receptacle in the vehicle 102 and a presence of the power cable coupling the AC bus to the house 104, as further explained below. In the example of FIG. 1, the sensor 112 (e.g., a ground sensor or monitor) measures an impedance between the neutral conductor 116 and the ground conductor 122. In such examples, the sensor 112 may directly measure the impedance. In other examples, the sensor 112 may sense electrical characteristics (e.g., a voltage and a current) associated with the neutral conductor 116 and the ground conductor 122, and the control module 114 may calculate the impedance between the neutral conductor 116 and the ground conductor 122 (e.g., by comparing impedances associated with the neutral conductor 116 and the ground conductor 122).

In the example of FIG. 1, the vehicle system 106 may further include a power interrupting device 146 coupled to an output of the power inverter 108. In such examples, the switching device 110 is coupled between the power inverter 108 and the power interrupting device 146. The power interrupting device 146 functions as a conventional current interrupter device. For example, the power interrupting device 146 may provide or interrupt the AC power from the power inverter 108 to the house 104 depending on whether the power interrupting device 146 is tripped (e.g., due to a current exceeding a threshold). In FIG. 1, the power interrupting device 146 may be any suitable current interrupter device, such as a ground fault circuit interrupter (GFCI), a ground fault interrupter (GFI), an arc fault circuit interrupter (AFCI), residual-current device (RCD), etc.

Figure 2:
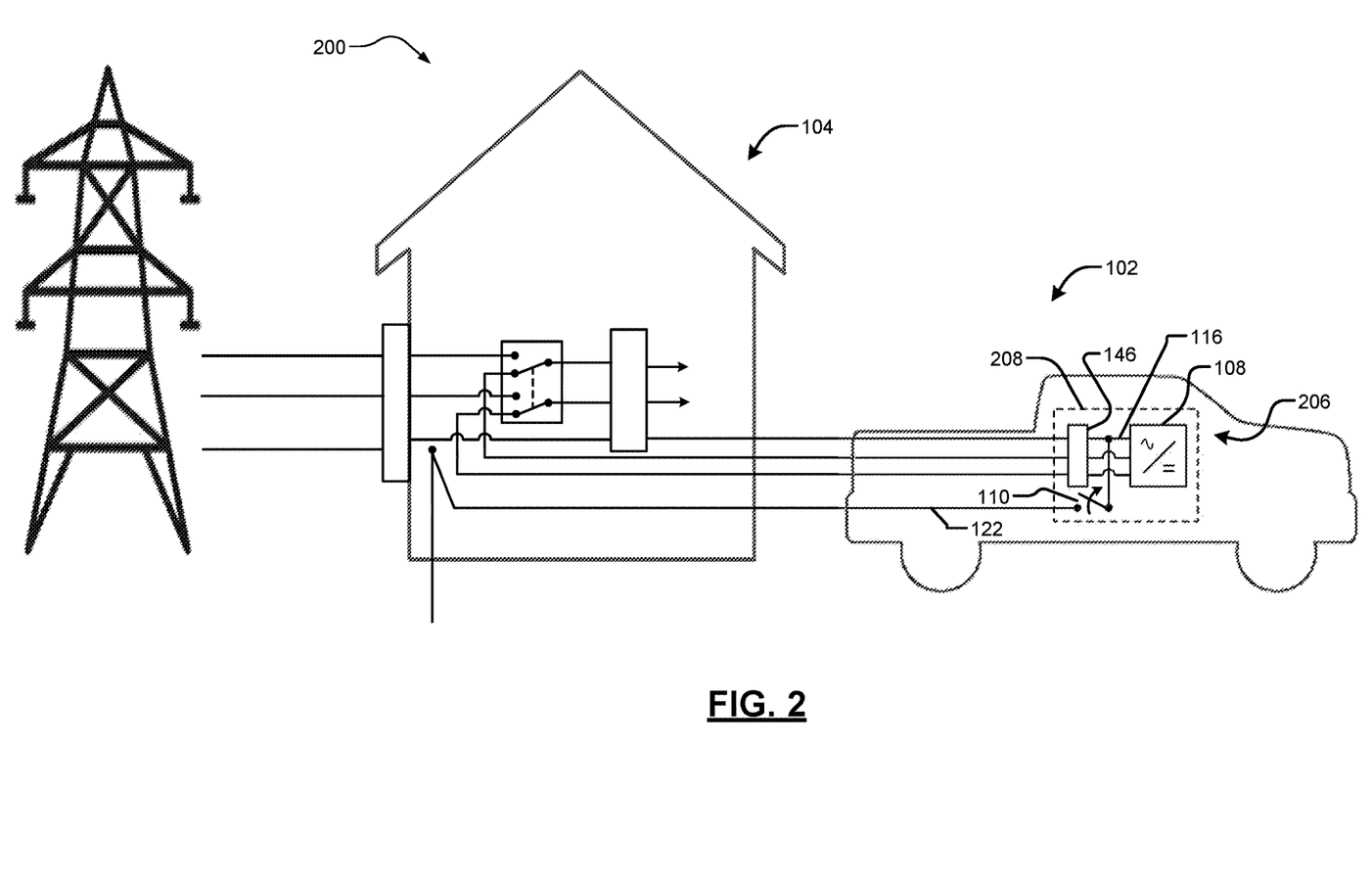

As shown in FIG. 1, the power interrupting device 146 may be or at least a part of the receptacle 124. For instance, the receptacle 124 may be a GFCI type receptacle. In other examples, the power interrupting device 146 may be a component within a power inverter module. For example, FIG. 2 depicts a system 200 substantially similar to the system 100 of FIG. 1 but where a power interrupting device is positioned with a power inverter module. Specifically, in FIG. 2, the system 200 includes the vehicle 102 and the house 104 of FIG. 1, and a vehicle system 206 with a power inverter module 208. In FIG. 2, the power inverter module 208 includes the power inverter 108, the power interrupting device 146, and the switching device 110 coupled between the neutral conductor 116 and the ground conductor 122 in the vehicle 102. While not shown in FIG. 2, the vehicle system 206 may include a receptacle (e.g., the receptacle 124 of FIG. 1) away from the power interrupting device 146 for connecting to a power cable extending between the house 104 and the vehicle 102, a control module (e.g., the control module 114 of FIG. 1), and sensor(s), as explained herein.

With continued reference to FIG. 1, the switching device 110 is coupled between the neutral conductor 116 of the AC bus and the ground conductor 122 in the vehicle 102. As further explained below, the switching device 110 is controllable to electrically connect or disconnect the neutral conductor 116 to ground in the vehicle to create a bonded neutral or a floating neutral. In various embodiments, the switching device 110 may be a normally closed switching device. In such examples, the normally closed switching device 110 creates a bonded neutral configuration with the neutral conductor 116 connected to the ground conductor 122 during a normal operation condition (e.g., a vehicle-to-load power mode). This ensures the power interrupting device 146 will trip to prevent electrical shock or current passing through a person. Then, when desired, the switching device 110 may be controlled to create a floating neutral configuration with the neutral conductor 116 disconnected from the ground conductor 122.

In the example of FIG. 1, the switching device 110 may be any suitable switching device. For example, the switching device 110 may be a solid-state device (e.g., a mechanical relay, an electromagnetic relay, etc.), an active device (e.g., a field-effect transistor (FET), a metal-oxide-semiconductor field-effect transistor (MOSFET), etc.), etc.

As shown in FIG. 1, the control module 114 is in communication with the power inverter 108, the switching device 110, and the sensor 112. In such examples, the control module 114 may control the power inverter 108 and/or the switching device 110 based on the impedance detected by the sensor 112.

For example, the control module 114 may initially transmit a control signal to open the switching device 110 (e.g., a normally closed switching device). In doing so, the neutral conductor 116 is disconnected from the ground conductor 122 (and more generally ground), thereby creating a floating neutral configuration between the power inverter 108 and the main disconnect switch 126 (or the house 104, a power receiving output, etc.). In such scenarios, a parallel path is not created when the power cable (or another suitable power cable) is plugged into the receptacle 124 and return current is prevented from flowing to the house 104 through the ground conductor 122.

In various embodiments, the control module 114 may transmit the control signal to open the switching device 110 only if one or more conditions are met. For instance, the control module 114 may transmit the control signal in response to a detection that the power cable (or another suitable power cable) is plugged into the receptacle 124, a door for the receptacle 124 is open, and/or user input (e.g., instructing the control module 114 to enter a vehicle-tohouse power mode, etc.). If each (or at least one) of the conditions is met, the control module 114 transmits the control signal to open the switching device 110. If, however, one or more of the conditions are not met, the control module 114 does not transmit the control signal to open the switching device 110 and the switching device 110 remains closed (e.g., in its normally closed state), thereby maintaining a bonded neutral configuration with the neutral conductor 116 connected to the ground conductor 122.

Then, the control module 114 may receive a signal from the sensor 112 indicative of the impedance between the neutral conductor 116 and the ground conductor 122. For example, in response to the switching device 110 being open, the control module 114 may receive a measured impedance between the neutral conductor 116 and the ground conductor 122 or obtain electrical characteristics for determining the impedance between the neutral conductor 116 and the ground conductor 122. In other examples, the control module 114 may command the sensor 112 to measure the impedance or obtain the desired electrical characteristics.

The control module 114 may then transmit a control signal to the power inverter 108 to provide AC power to the house 104. In such examples, the control module 114 transmits the control signal to the power inverter 108 in response to the impedance between the neutral conductor 116 and the ground conductor 122 being less than or equal to a defined threshold. In various embodiments, the defined threshold may be substantially zero, such as 0 ohms, 0.01 ohms, 0.03 ohms, 0.05 ohms, 0.07 ohms, etc. If the impedance between the neutral conductor 116 and the ground conductor 122 is less than or equal to the defined threshold, the switching device 110 remains open to create a floating neutral configuration.

In various embodiments, the control module 114 does not initiate control of the power inverter 108 if the impedance between the neutral conductor 116 and the ground conductor 122 is greater than the defined threshold. In such examples, a presence of impedance between the neutral conductor 116 and the ground conductor 122 indicates that the neutral conductor 116 and the ground conductor 122 are not electrically coupled at some point (e.g., via the switching device 110 and/or at another location). In response to the impedance between the neutral conductor 116 and the ground conductor 122 is greater than the defined threshold (e.g., greater than substantially zero), the control module 114 may transmit a control signal to close the switching device 110 and not transmit a control signal to the power inverter 108 to provide AC power to the house 104.

In some examples, the power interrupting device 146 may function normally when the control module 114 enters the vehicle-to-house power mode to open the switching device 110 and provide power to the house 104. For example, the power interrupting device 146 may trip if current flowing on the ground conductor 122 exceeds a minimal threshold (e.g., 5 mA), as is conventional. In other examples, the current threshold may be increased to a higher value or the power interrupting device 146 may be disabled when the control module 114 enters the vehicle-to-house power mode. The increased threshold or disabling of the power interrupting device 146 is possible because the house 104 should include power interrupting protection, such as a GFCI.

Figure 3:
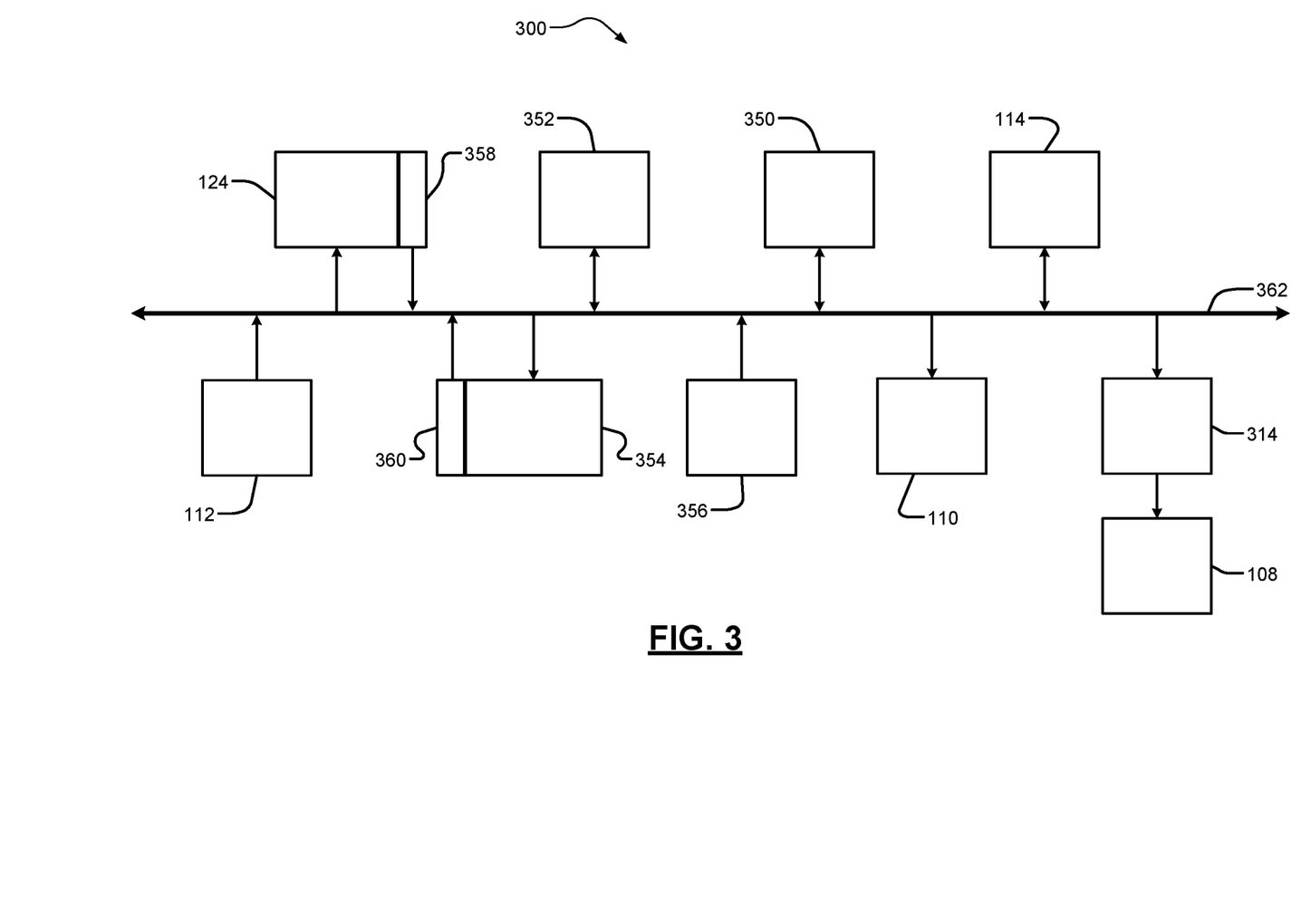
FIG. 3 is a block diagram of an example vehicle system for providing AC power from a vehicle to a house, according to the present disclosure.

FIG. 3 depicts an example vehicle system 300 that may be implemented as the vehicle systems 106, 206 of FIGS. 1-2. As shown in FIG. 3, the vehicle system 300 generally includes the power inverter 108, the switching device 110, the sensor 112 (e.g., impedance sensor), the control module 114, and the receptacle 124 of FIG. 1. Additionally, the vehicle system 300 may include an inverter control module 314, a display module 350, a user device 352, one or more additional receptacles 354 (referred to herein as secondary receptacles), a diagnostic module 356, and sensors 358, 360. In such examples, the secondary receptacles 354 may be receptacles in or on the vehicle 102 of FIG. 2 for providing a nominal voltage (e.g., 120 VAC) to power external devices (e.g., user devices, etc.).

Although FIG. 3 illustrates the vehicle system 300 as including specific modules and/or sensors, it should be appreciated that the vehicle system 300 and/or other systems may include one or more other modules and/or sensors (e.g., having the same or different functionalities) if desired. Additionally, while the vehicle system 300 is shown as including multiple separate modules, any combination of the modules (e.g., the control module 114, the diagnostic module 356, the inverter control module 314, etc.) and/or the functionality thereof may be integrated into one or more modules.

In various embodiments, the modules and sensors of the vehicle system 300 may be in communication with each other and may share parameters via a network 362, such as a controller area network (CAN). In such examples, the parameters may be shared via one or more data buses of the network 362. As such, various parameters may be made available by a given module and/or sensor to other modules and/or sensors via the network 362.

In the example of FIG. 3, the control module 114 may include similar functions as explained above relative to FIG. 1. For example, and as explained above, the control module 114 initially transmits a control signal to open the switching device 110 to disconnect the neutral conductor 116 of FIG. 1 from the ground conductor 122 of FIG. 1. In various embodiments, the control module 114 may control the power inverter 108 to shut off AC voltage before opening the switching device 110. Then, the control module 114 receives a signal from the sensor 112 indicative of the impedance between the neutral conductor 116 and the ground conductor 122. If the impedance between the neutral conductor 116 and the ground conductor 122 is less than or equal to a defined threshold, the control module 114 then transmits a control signal to the power inverter 108 to provide AC power to the house 104 of FIG. 1, as explained above. In such examples, the control module 114 may transmit the control signal directly to the power inverter 108 or to the inverter control module 314 (e.g., an on-board control module) in the power inverter 108. If the impedance is greater than the defined threshold, the control module 114 transmits a control signal to close the switching device 110.

In various embodiments, the control module 114 transmits the control signal to open the switching device 110 only if defined conditions are met. For example, the control module 114 may transmit the control signal to open the switching device 110 only if the user requests to provide power to the house 104 of FIG. 1 and/or another suitable power receiving output external to the vehicle 102 of FIG. 1. For example, a user may select an input on the user device 352 (e.g., a cell phone, etc.) and/or on the display module 350 in the vehicle 102 (e.g., a center console display module with a user interface) indicating a desire to provide power from the receptacle 124 (e.g., enter a vehicle-to-house power mode). In such examples, the control module 114 may receive a signal from the user device 352 and/or the display module 350 requesting AC power be provided. Then, in response to receiving this signal, the control module 114 may transmit the control signal to open the switching device 110, as explained herein.

In some examples, the sensors 358, 360 of FIG. 3 may provide an indication that the receptacles 124, 354 are in use or will be in use. In such examples, the sensors 358, 360 may generally detect a presence of or a possibility of a power cable being plugged into the receptacles 124, 354. For instance, any one of the sensors 358, 360 may detect if a door associated with its corresponding receptacle 124, 354 is open and/or detect whether a power cable is plugged into its corresponding receptacle 124, 354. In such examples, the presence of or the possibility of a power cable being plugged into the receptacles 124, 354 may be detected based on one or more sensed electrical characteristics associated with the receptacles 124, 354 and/or one or more sensed physical characteristics (e.g., motion, location, etc.) associated with the receptacles 124, 354. More specifically, the sensors 358, 360 may detect current flow, a resistance, a blocked infrared signal, etc. associated with the receptacles 124, 354.

In such examples, the control module 114 may or may not transmit the control signal to open the switching device 110 based on signals received from the sensors 358, 360. For example, if the control module 114 receives a signal from the sensor 358 indicating the power cable is present (e.g., is or likely plugged into the receptacle 124), then the control module 114 may transmit the control signal to open the switching device 110 to create a floating neutral configuration. Additionally, if the control module 114 receives a signal from each sensor 360 indicating no power cable is present (e.g., a device is or likely plugged into one of the secondary receptacles 354) or does not receive a signal from any of the sensors 360, then the control module 114 may transmit the control signal to open the switching device 110 to create the floating neutral configuration. Alternatively, if the control module 114 receives a signal from one of the sensors 360 indicating a power cable is present (e.g., a device is or likely plugged into one of the secondary receptacles 354), then the control module 114 may not transmit the control signal to open the switching device 110 to maintain a bonded neutral configuration.

In some examples, the control module 114 may be operable to disable one or more of the secondary receptacles 354. For example, the control module 114 may electronically disable individual receptacles 354 or a group of receptacles 354 based on operating conditions. In such examples, the control module 114 may control one or more circuit breakers associated with the secondary receptacles 354 to disable the secondary receptacles 354 when, for example, the use requests to enter the vehicle-to-house power mode.

In various embodiments, the diagnostic module 356 may function to ensure the switching device 110 is in the intended position. For example, the diagnostic module 356 may include suitable circuitry and logic to detect whether the switching device 110 is open or closed. Then, the diagnostic module 356 can provide a signal to the control module 114 indicating whether the switching device 110 is open or closed.

Figure 4:
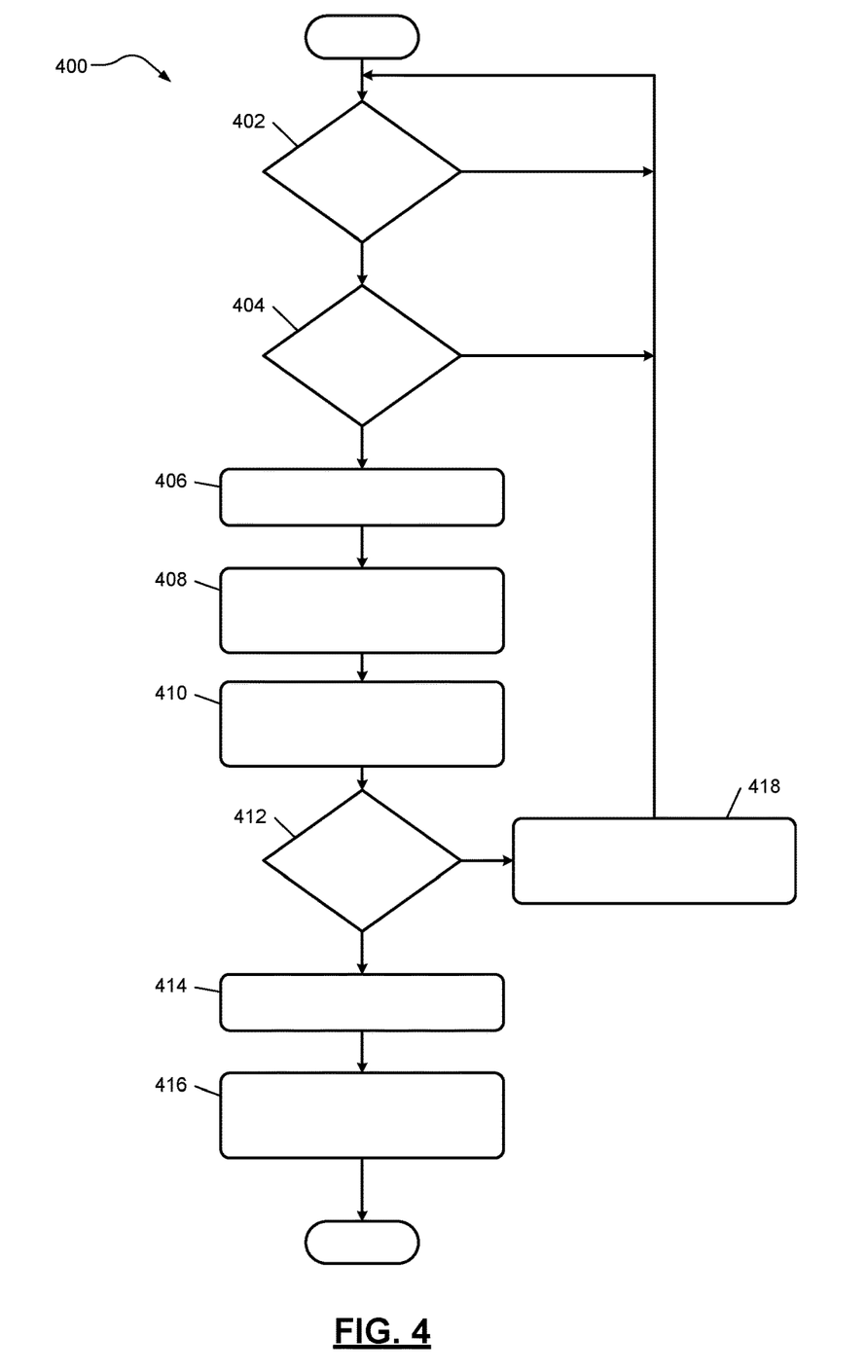
FIG. 4 is a flowchart of example control process for providing AC power from a vehicle to a house, according to the present disclosure; and In the drawings, reference numbers may be reused to identify similar and/or identical elements.

FIG. 4 illustrates an example control process 400 for providing AC power from a vehicle to an output (e.g., a house, a building, etc.) external to the vehicle. Although the example control process 400 is generally described in relation to the vehicle system 300 of FIG. 3, the control process 400 may be employable by another suitable vehicle system (e.g., the vehicle system 106 of FIG. 1, the vehicle system 206 of FIG. 2, etc.).

In FIG. 4, the control process 400 begins at 402 where the control module 114 determines whether a power cable is plugged into the receptacle 124. For example, the control module 114 may receive a signal from the sensor 358 of FIG. 3 indicating the presence of or a possibility of a power cable being plugged into the receptacle 124, as explained above. If the control module 114 determines that a power cable is plugged into the receptacle 124 (e.g., based on a signal from the sensor 358), the control process 400 proceeds to 404. Otherwise, if the control module 114 determines that no power cable is plugged into the receptacle 124 (e.g., the control module 114 does not receive a signal from the sensor 358 or receives a signal from the sensor 358 indicating no presence of a power cable), the control process 400 returns to 402. In such examples, the switching device 110 (e.g., a normally closed switching device) remains closed or is closed if the switching device 110 is open.

At 404, the control module 114 determines whether a user request is received indicating a desire to provide power to the output external to the vehicle. For example, and as explained above, a user may select an input on the user device 352 and/or on the display module 350 requesting to enter a vehicle-to-house power mode (e.g., to provide power from the receptacle 124 to the output external to the vehicle). If no such user request is received, the control process 400 returns to 402. In such examples, the switching device 110 remains closed or is closed if the switching device 110 is open. If, however, the control module 114 does receive the user request, the control process 400 proceeds to 406, where the control module 114 disables the power inverter 108. In various embodiments, the control module 114 may directly disable the power inverter 108 via one or more control signals or disable the power inverter 108 by providing one or more control signals to the inverter control module 314 of FIG. 3. The control process 400 then proceeds to 408.

At 408, the switching device 110 is manually or electronically opened to create a floating neutral configuration with a neutral conductor in the vehicle disconnected from a ground conductor in the vehicle. For example, a user may manually control the switching device 110 to change from a closed position to an open position. In other examples, the control module 114 may transmit a control signal to open the switching device 110. The control process 400 then proceeds to 410.

At 410, an impedance between the neutral conductor and the ground conductor in the vehicle is determined. For example, and as explained above, the sensor 112 measure an impedance between the neutral conductor and the ground conductor or sense electrical characteristics associated with the neutral conductor and the ground conductor to enable the control module 114 to calculate the impedance. The control process 400 then proceeds to 412.

At 412, the control module 114 determines whether the determined impedance is less than or equal to a defined threshold. This determination may be made by, for example, a comparison between the determined impedance (or a representative value thereof) and the defined threshold. In various embodiments, the defined threshold may be substantially zero, as explained above.

If the impedance is less than or equal to the defined threshold, the control process 400 proceeds to 414. At 414, the control module 114 disables one or more secondary receptacles in or on the vehicle for providing a nominal voltage (e.g., 120 VAC) to power external devices (e.g., user devices, etc.). For example, the control module 114 may control one or more circuit breakers or other disconnecting means associated with the secondary receptacles (e.g., the secondary receptacles 354 of FIG. 3) to disable the secondary receptacles. The control process 400 then proceeds to 416, where the control module 114 enters a vehicle-to-house power mode and transmits a control signal to the power inverter 108. In such examples, the power inverter 108 may be controlled (e.g., by the control module 114, the inverter control module 314, etc.) to provide AC power to the output (e.g., a house, a building, etc.) external to the vehicle. The control process 400 may then end.

If, however, the impedance is greater than the defined threshold, the control process 400 proceeds to 418. At 418, the control module 114 transmits a control signal to close the switching device 110 to create a bonded neutral configuration with the neutral conductor connected to the ground conductor. In such examples, the control module 114 may enter a vehicle-to-load power mode and the power inverter 108 may be controlled (e.g., by the control module 114, the inverter control module 314, etc.) to provide AC power to the secondary receptacles in or on the vehicle for powering a load connected thereto if applicable. The control process 400 then returns to 402.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system in a vehicle for providing AC power to an output external to the vehicle, the vehicle system comprising:
    a power inverter coupled to an AC bus having a neutral conductor, the power inverter configured to provide AC power to the output external to the vehicle via the AC bus;
    a switching device coupled between the neutral conductor of the AC bus and a ground conductor in the vehicle;
    a sensor configured to measure an impedance between the neutral conductor and the ground conductor; and
    a control module in communication with the sensor and the switching device, the control module configured to:
        transmit a control signal to open the switching device to create a floating neutral configuration between the power inverter and the output external to the vehicle;
        receive a signal from the sensor indicative of the impedance between the neutral conductor and the ground conductor; and
        in response to the impedance between the neutral conductor and the ground conductor being less than or equal to a defined threshold, transmit a control signal to the power inverter to provide AC power to the output external to the vehicle.

2. The vehicle system of claim 1, further comprising a power interrupting device coupled to an output of the power inverter.

3. The vehicle system of claim 2, wherein the power interrupting device includes a ground fault circuit interrupter (GFCI).

4. The vehicle system of claim 2, wherein the switching device is coupled between the power inverter and the power interrupting device.

5. The vehicle system of claim 1, wherein the switching device is a normally closed switching device.

6. The vehicle system of claim 1, wherein the power inverter is a unidirectional power inverter or a bidirectional converter.

7. The vehicle system of claim 1, wherein:
    the sensor is a first sensor;
    the vehicle system further comprises a receptacle configured to receive a power cable for coupling the AC bus to the output external to the vehicle, and a second sensor configured to detect a presence of the power cable; and
    the control module is configured to receive a signal from the second sensor indicating the power cable is present, and transmit the control signal to open the switching device in response to receiving the signal from the second sensor.

8. The vehicle system of claim 1, further comprising a user input device in communication with the control module, wherein the control module is configured to:
    receive a signal from the user input device requesting AC power be provided to the output external to the vehicle; and
    transmit the control signal to open the switching device in response to receiving the signal from the user input device.

9. The vehicle system of claim 1, wherein:
    the sensor is a first sensor;
    the vehicle system further comprises at least one secondary receptacle in the vehicle and coupled to the power inverter, and a second sensor configured to detect a presence of a device being plugged into the at least one secondary receptacle; and
    the control module is configured to receive a signal from the second sensor indicating no device is present and transmit the control signal to open the switching device in response to receiving the signal from the second sensor.

10. The vehicle system of claim 1, wherein the defined threshold is substantially zero.

11. The vehicle system of claim 1, wherein the control module is configured to transmit a control signal to close the switching device in response to the impedance between the neutral conductor and the ground conductor being greater than the defined threshold.

12. A vehicle comprising the vehicle system of claim 1 configured to provide AC power to an output external to the vehicle.

13. A control method for providing AC power in a vehicle to an output external to the vehicle, the vehicle including a power inverter coupled to an AC bus having a neutral conductor and a switching device coupled between the neutral conductor of the AC bus and a ground conductor in the vehicle, the control method comprising:
    transmitting a control signal to open the switching device to create a floating neutral configuration between the power inverter and the output external to the vehicle;
    determining an impedance between the neutral conductor of the AC bus and the ground conductor in the vehicle; and
    in response to the impedance between the neutral conductor and the ground conductor being less than or equal to a defined threshold, transmitting a control signal to the power inverter to provide AC power to the output external to the vehicle.

14. The control method of claim 13, wherein the switching device is a normally closed switching device.

15. The control method of claim 13, wherein the power inverter is a unidirectional power inverter or a bidirectional converter.

16. The control method of claim 13, wherein:
the control method further comprises sensing a presence of a power cable configured to couple the AC bus to the output external to the vehicle; and
transmitting the control signal to open the switching device includes transmitting the control signal to open the switching device in response to sensing the presence of the power cable.

17. The control method of claim 13, wherein:
the control method further comprises receiving a signal from a user input device requesting AC power be provided to the output external to the vehicle; and
transmitting the control signal to open the switching device includes transmitting the control signal to open the switching device in response to receiving the signal from the user input device.

18. The control method of claim 13, wherein:
the vehicle comprises at least one secondary receptacle coupled to the power inverter and a sensor configured to detect a presence of a device being plugged into the at least one secondary receptacle; and
the control method further comprises receiving a signal indicating no device is plugged into the at least one secondary receptacle in the vehicle; and transmitting the control signal to open the switching device includes transmitting the control signal to open the switching device in response to receiving the signal.

19. The control method of claim 13, wherein the defined threshold is substantially zero.

20. The control method of claim 13, further comprising transmitting a control signal to close the switching device in response to the impedance between the neutral conductor and the ground conductor being greater than the defined threshold.

* * * * *